United States Patent [19]

Takayama et al.

[11] 4,215,978

[45] Aug. 5, 1980

[54] RESIN MOULDING SCREWS

[75] Inventors: Seizo Takayama; Kiyoshi Hashimoto, both of Ube, Japan

[73] Assignee: Ube Industries, Ltd., Japan

[21] Appl. No.: 924,657

[22] Filed: Jul. 14, 1978

[51] Int. Cl.$^2$ .............................................. B29F 3/02
[52] U.S. Cl. .................................. 425/190; 198/661; 425/208; 366/79; 366/89
[58] Field of Search .............................. 425/190, 208; 264/176 R, 349; 198/661; 366/79, 89

[56] References Cited

U.S. PATENT DOCUMENTS

| | | | |
|---|---|---|---|
| 3,698,541 | 10/1972 | Barr | 198/661 |
| 3,701,512 | 10/1972 | Schippers et al. | 259/191 |
| 4,128,341 | 12/1978 | Hsu | 366/89 |

FOREIGN PATENT DOCUMENTS

| | | | |
|---|---|---|---|
| 2516376 | 10/1975 | Fed. Rep. of Germany | 425/208 |
| 1359672 | 7/1974 | United Kingdom | 425/208 |

*Primary Examiner*—Paul R. Michl
*Attorney, Agent, or Firm*—Claude A. S. Hamrick

[57] ABSTRACT

In a resin moulding screw provided with helical flight and valley, the bottom surface of valley is divided into a plurality of portions along a dividing line, and the divided portions are alternately displaced in the radial direction to form wavy contours. Barriers are provided to cross the dividing line to form dams which prevent intercommunication of the valleys at the bottom of the screw groove to prevent decrease of the thrust pressure along the flight for efficiently blending and melting solid and molten resins.

2 Claims, 9 Drawing Figures

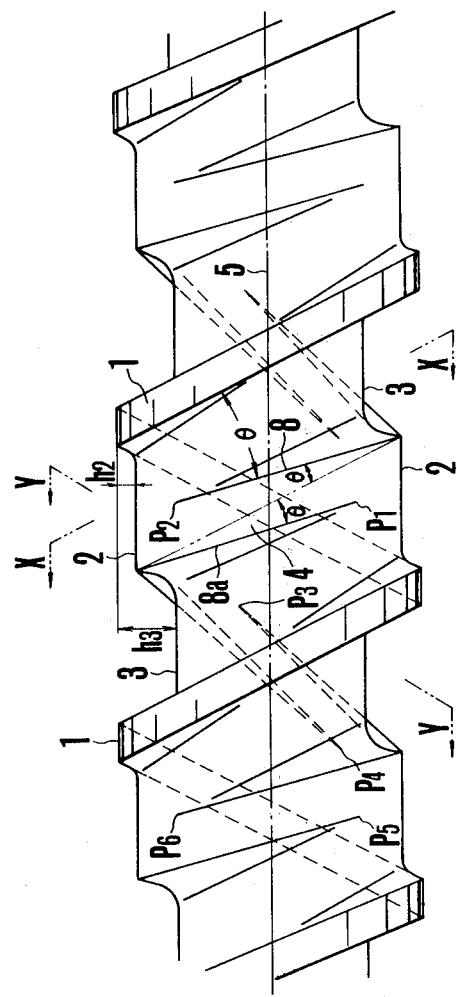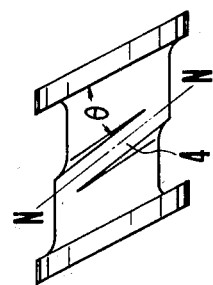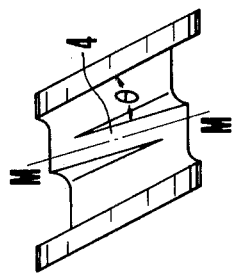

RESIN MOULDING SCREWS

BACKGROUND OF THE INVENTION

This invention relates to a screw utilized in an injection moulding machine and an extrusion moulding machine for plasticizing resinous materials.

In a screw for moulding resinous materials in cooperation with a barrel at high temperatures in which the screw is rotated to advance the helical flight while inter-working the resinous meterial initially in the form of a solid bed into a melt, it is necessary to uniformly heat the plasticized and molten resinous material and to thoroughly knead and homogeneously melt the same. It is also necessary to thoroughly degass the molten resinous material. The molten resinous material must have short and uniform thermal hysteresis.

A conventional screw can not always fulfill these requirements. More particularly, in an ordinary screw, not yet molten resinous material and molten material are separated in the groove of the screw. Such tendency is especially remarkable in a crystalline resin. Where a so-called solid bed, that is, a not yet molten solid phase is formed and the solid bed is sequentially melted starting from the contact surface between the solid phase and the inner wall of the barrel, mutual heat exchange between the solid bed and the molten resin and admixture thereof are not sufficient. Thermal hysteresis also differs between the resinous material which has melted at the early stage of the screw moulding and that melted near the last or exit stage of the screw moulding. This also prevents homogenization of the molten resinous material. To exclusively ensure homogenization, according to a prior art design, the length of the screw was made sufficiently long. This design not only degrades the thermal hysteresis but also increases the cost of manufacturing. Thus, a number of solutions have hitherto been proposed to ensure homogeneous melting. For example, it has been proposed to implant pins or keys in the grooves of the screw, to remove flight for several pitches and substitute barriers or to make wavy the flight. However, these designs are not yet satisfactory.

In a copending patent application Ser. No. 757,042 filed on Jan. 5, 1977, assigned to the assignee of the present application, there is disclosed a screw provided with helical flight and valley wherein the bottom surface of valley is divided into a plurality of parallel strip shaped portions having wavy contours with a predetermined phase difference therebetween thereby forming a plurality of cross points between the wavy contours along the dividing plane. Although this construction can efficiently rupture solid phase resin to homogenize the molten resin and to improve heat distribution and blending, the valleys of the divided portions communicate with each other at the cross point thus decreasing the thrust pressure.

SUMMARY OF THE INVENTION

Accordingly, it is a principal object of this invention to improve the screw described in said patent application for preventing the communication of the valleys thereby preventing decrease in the thrust pressure.

According to this invention there is provided a screw provided with one helical flight and one valley along the flight and utilized for molding a resinous material in cooperation with a barrel at high temperatures in which the screw is rotated to advance the helical flight while working the resinous material initially in the form of a solid bed into a melt, wherein the bottom surface of the valley is divided into a plurality of portions along a dividing line extending along the screw flight, the divided portions of the bottom surface being alternately displaced in the radial direction along the screw flight to form wavy contours, the improvement wherein a plurality of barriers each crossing the dividing line are provided to form a dam between one hill and the opposite hill at the bottom of the screw for preventing intercommunication of the valleys of the divided portions, each barrier having one edge line extending from the one hill and terminating in the hillside of the opposite hill to form one cross point and the other edge line extending from the opposite hill and terminating in the hillside of the one hill to form the other cross point, the barriers being inclined at an angle with respect to the screw flight such that one of angularly adjacent dams and the other lie in mutually intersecting directions.

With this improved construction, the barrier interconnects the hills to form a dam across the screw groove which prevents intercommunication of the valleys and the decrease in the thrust pressure along the screw flight, thereby applying an effective pressure to the solid bed. As the bottom surface of the screw groove transits from the hill to the valley, the barrier top crosses the bottom surface of the groove at the hillsides to form cross points, thereafter gradually increasing the level difference between the barrier top and the bottom surface. Accordingly, breaking up of the solid bed is effected smoothly by the cross points, thereby simultaneously effecting shearing of the solid bed and contact and heat transfer between fractions of the solid bed and the molten resin through their inferface. The level difference between the bottom surface of the groove and the barrier overlaps and blends the broken up fractions of solid bed and enhances blending by giving a large relative displacement. Since the barrier is provided at an angle with respect to the screw flight instead of in parallel, that is, axially offset, two types of angularly adjacent dams are provided, one of an angle to advance the resin to the discharge side and the other at an angle to push back the resin towards the supply side, thus creating extremely complicated blending actions. The barrier, the wavy screw groove bottom surface and the rising hill cause selective melting of the resin at the final stage of melting. More particularly, at the end of the compression region or the initial stage of the meterring region, the molten resin is forced to pass through the barrier gap which is smaller than the barrier gap formed between the barrel inner wall and the barrier at the end of the supply region or at the initial stage of the compression stage so that passage of the not yet molten solid resin is prevented, thereby maintaining a high thrust pressure. Consequently, the solid resin is guided toward the hill at the bottom surface of the screw groove and subjected to higher pressure and thus readily melted.

BRIEF DESCRIPTION OF THE DRAWINGS

In the accompanying drawings:

FIG. 1A is a side view showing one embodiment of the screw according to this invention;

FIG. 1B is a side view showing a portion of FIG. 1A;

FIG. 1C is a side view showing the same portion as FIG. 1B as viewed from the rear side;

DESCRIPTION OF THE PREFERRED EMBODIMENTS

Figure 2:
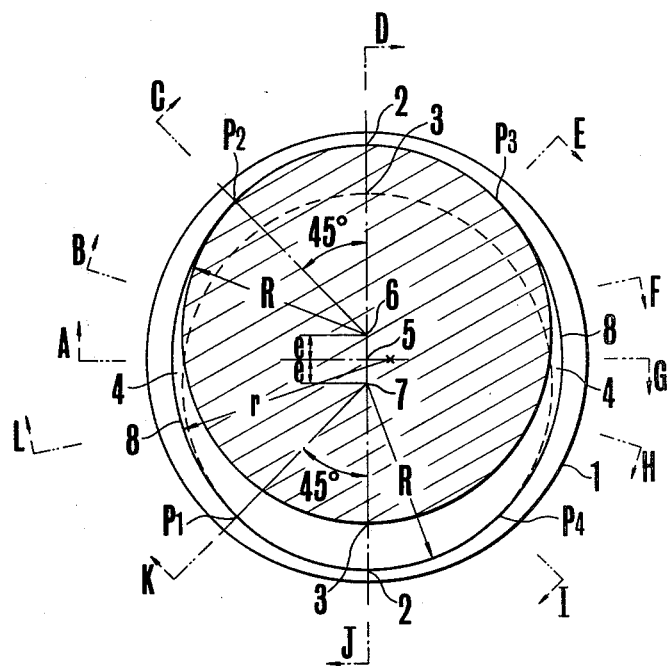
FIG. 2 is a cross-sectional view of the screw shown in FIG. 1.

In one embodiment of the screw shown in FIGS. 1 and 2, the bottom surface of the groove along a screw flight 1 is divided into a plurality of portions, two in this illustration, and the divided two portions are alternately displaced in the radial direction to form wavy surfaces, thus forming hills 2 and valleys 3 on the bottom surface of the screw groove, with the hills interconnected by a barrier 4. To have better understanding, in FIG. 2 are shown a left hand half section obtained by cutting from the front side of the sheet of drawing along a line X—X in parallel with the flight as seen in the direction toward the discharge side of the screw shaft, and a right hand half section obtained by cutting from the rear side of the sheet along a line Y—Y and seen in the direction toward the discharge side. In an embodiment shown in FIG. 2, the wavy form obtained by dividing into two the bottom surface of the groove of the screw along the flight and alternately displacing the divided portions in the radial direction is shown by circles having a radius R and centers 6 and 7 which are eccentric from the axis 5 of the screw by e, and the barrier 4 is formed by a circle in contact with two circles respectively having their centers at eccentric points 6 and 7. The barrier 4 contacts two eccentric circles having centers at 6 and 7 at positions $P_1$ to $P_4$ inclined 45° with respect to the vertical axis shown in FIG. 2. Thus, the barrier 4 has one edge line 8a extending from one hill and terminating in the hillside of the opposite hill to form one cross point $P_1$ and the other edge line 8 extending from the opposite hill and terminating in the hillside of the one hill to form the other cross point $P_2$. Break-up and rupture of the solid bed start from these cross points $P_1$, $P_3$ and $P_5$ and the edge line 8a overlaps not yet molten resinous material descending from hill to valley and the resinous material which has overridden the barrier. Although the values of eccentricity e, the radius of eccentric circle, and the radius r of the barriers 4 are not equal in the supply and discharge regions of the actual screw, these values are constant in each region. In the compression region these values vary slightly from the values in the supply region to the values in the metering region. Let us denote the gaps h2 and h3 between the hill 2 and the barrel inner wall and between the valley 3 and the barrel inner wall by $h_2f$ and $h_3f$ in the supply region of the screw and by $h_2m$ and $h_3m$ in the metering region, we obtain the following relationship, $$h_2f > h_2m, \quad h_3f > h_3m$$

Thus, the gaps vary from $h_2f$ to $h_2m$, and from $h_3f$ to $h_3m$ in the compression region.

As shown in FIGS. 1B and 1C, the barrier 4 is inclined at an angle $\theta$ with respect to the screw flight. Especially, as shown in FIG. 1B, the barrier as viewed from the front side lies on line M—M and the barrier as viewed from the rear side lies on line N—N as shown in FIG. 1C. Lines M—M and N—N mutually intersects so that FIG. 1B barrier advances the resinous material to the discharge side and FIG. 1C barrier pushes back the resinous material to the supply side, thereby improving blending actions.

By denoting the angle $\theta$ between the screw flight 1 and the barrier 4 by $\theta_f$ in the supply region and by $\theta_m$ in the metering region, $$\theta_m > \theta_f$$

holds. This means that $\theta$ varies from $\theta_f$ to $\theta_m$ in the compression region.

Figure 4:
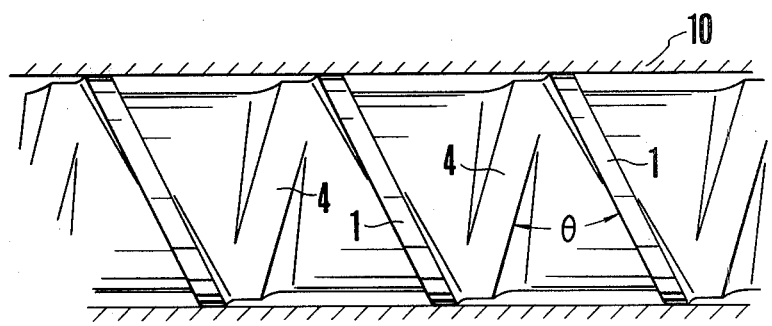
FIG. 4 is a side view showing a modified embodiment of this invention.
Figure 3:
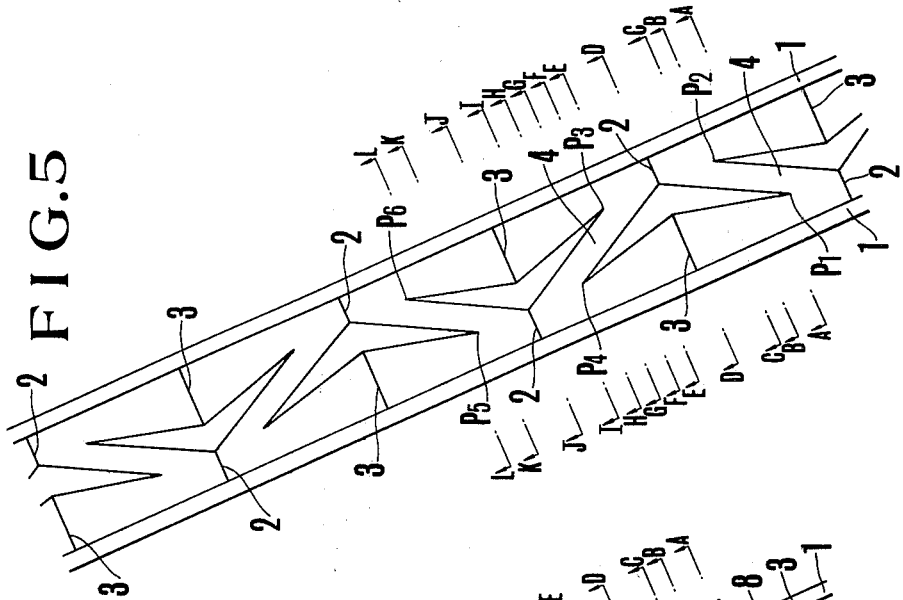
FIG. 3 is an exploded view of the screw shown in FIG. 1.
Figure 5:
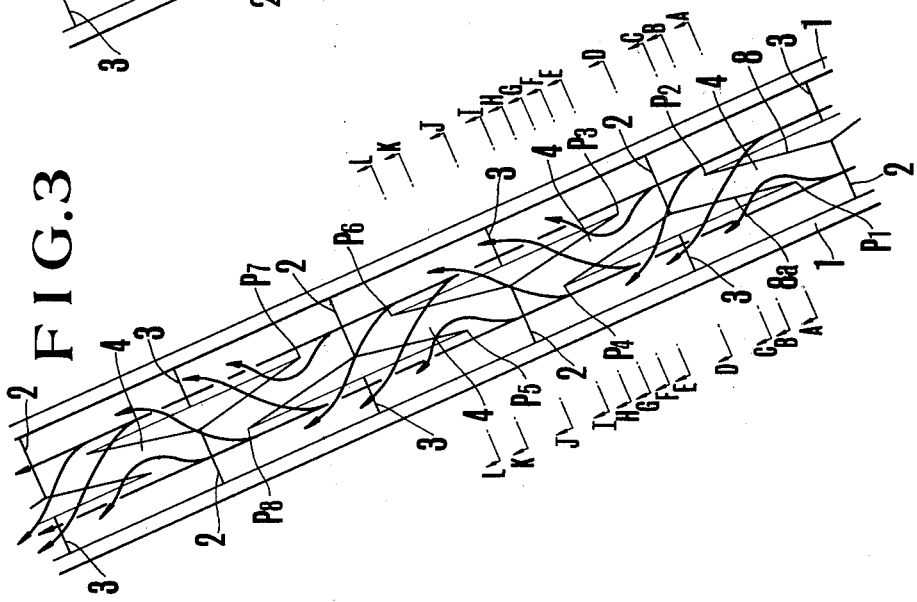
FIG. 5 is an exploded view of the screw shown in FIG. 4.

FIG. 1A shows the shape of the screw at a portion of the supply region immediately before the compression region, and FIG. 3 shows a developed view of a groove of the screw. FIG. 4 shows the meterring region of the screw and FIG. 5 shows a developed view of a screw groove thereof. Arrows shown in FIG. 3 show the movement of the solid bed and FIGS. 6A–6L show the shape of a screw groove cut at right angles with respect to the screw flight. FIGS. 7A–7L show the shape of a screw groove shown in FIGS. 4 and 5 similarly cut at right angles with respect to the flight. Especially, FIGS. 6A–6L show the behaviors of the solid bed only slightly melted whereas FIGS. 7A–7L show that of the substantially molten solid bed containing a small quantity of not yet molten solid bed.

Figure 6:
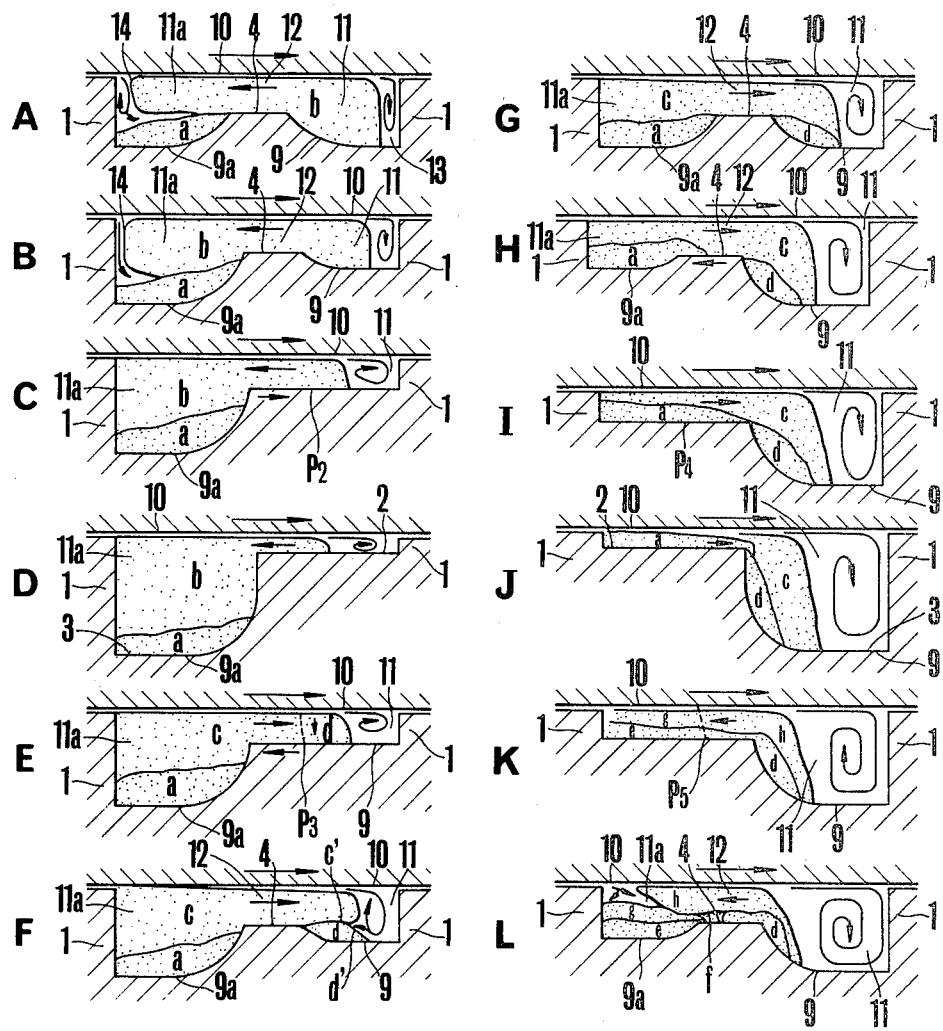
FIGS. 6A through 6L and FIGS. 7A through 7L are sectional views useful to explain the operation of the screws shown in FIGS. 1 and 4, respectively taken along lines A—A through L—L.
Figure 7:
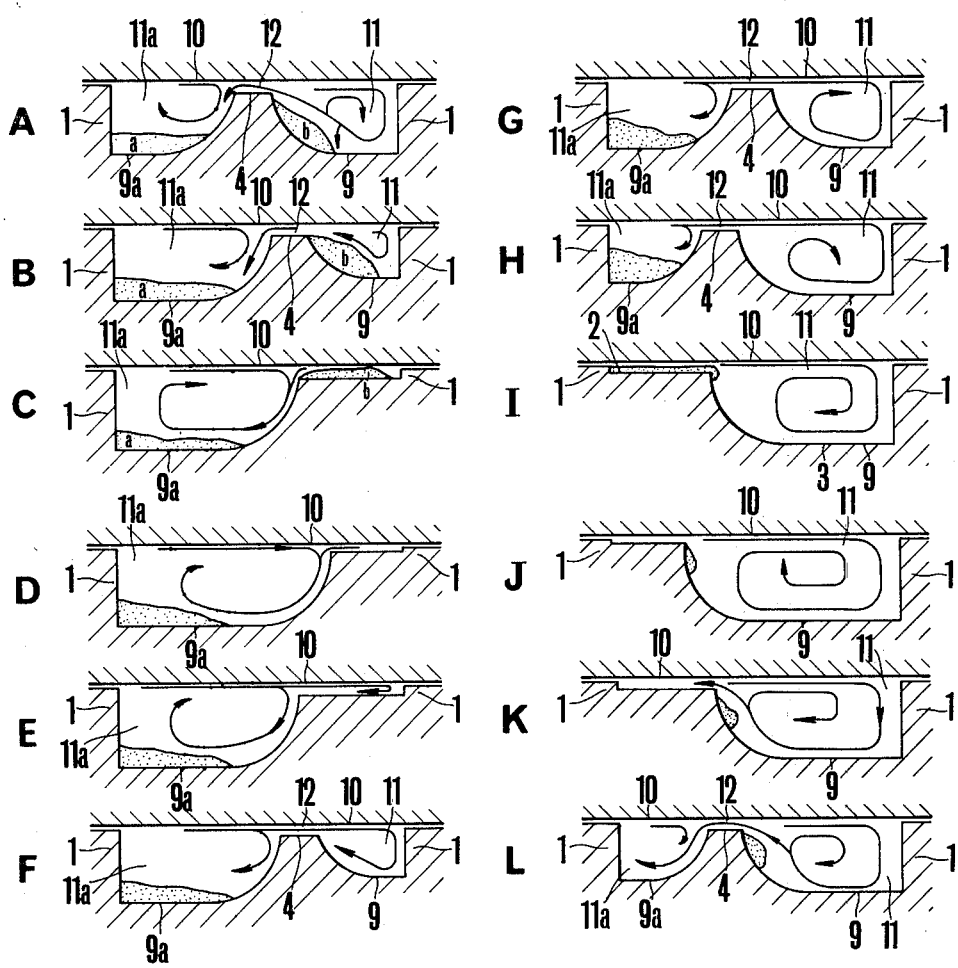

As shown in FIG. 6A, a compartment defined by the inner wall 10 of the barrel, the screw flight 1, bottom surfaces 9 and 9a of the groove and the barrier 4 is divided into spaces 11, 11a and 12 by the barrier 4. As the barrier 4 moves in the axial direction so that the bottom surface 9a lowers and the bottom surface 9 rises, the spaces 11a and 11 vary. Accordingly, the solid bed b contained in the space 11 is forced toward the space 11a by the thrust pressure created in the body of the molten resin 13 by the rotation of the screw. This solid bed b is subjected to a relatively large plastic working when it is forced to pass through a gap defined by the inner wall 10 of the barrel and the barrier 4 by a high thrust pressure. In other words, as the sectional area decreases, the solid bed passing through the space 12 is totally subjected to a plastic deformation with the result that heat is generated in the solid bed to increase its temperature. In the initial portion of the supply region, air is entrained in the particles of the solid resin and the resin particles are transferred to the space 11a to form the solid bed of the solid resin by gradually expelling the entrained air and increasing apparent specific gravity. On the other hand, in space 11, the solid bed is moved at a high speed with respect to the screw and strongly urged against the inner wall 10 at high temperatures of the barrel by the high thrust force described above. This large thrust pressure is created since the solid bed is displaced in the axial direction and across the screw groove and since the bottom surface of the screw groove is displaced in the radial direction when the solid bed is applied with a sufficiently large driving torque and speed by a driving device. Such large pressure is effective to enhance the removal of a molten resin film between the barrel inner wall 10 and the solid bed so as to decrease the thickness of the molten resin film. Consequently, the melting of the resin is accelerated and the blending is improved. Moreover, as the barrier obliquely crosses the screw groove, it is possible to work the entire mass of the solid bed. FIGS. 6A-6D show a manner of axially displacing the barrier 4 from the center of the groove to the right at the same time when the groove bottom surfaces 9 and 9a displaces in the radial direction thus approaching the flight 1. FIG. 6C shows a state in which the upper surface of the barrier 4 on the bottom surface 9 of the screw groove gradually rise to point $P_2$ at which the barrier and the bottom surface occupy the same radial position. At this point, the function of the barrier disappears but the upper surface of the barrier 4 and the bottom surface 9 further rise at the same time so that the last portion of the solid bed in the space 11 may be worked thoroughly and homogeneously. FIGS. 6E, 6F and 6G show the manner of reversing the movement of the solid bed passing on the barrier 4.

In the states shown in FIGS. 6D and 6E, both the upper surface of the barrier and the bottom surface of the groove descend. At point $P_3$ shown in FIG. 6E the radial displacement of the barrier 4 terminates but the bottom surface 9 continues to descend. As a consequence, at point $P_3$ the solid bed b is ruptured into fractions c and d. At the boundary surfaces c' and d' at which the rupture of the solid bed takes place the ruptured solid bed fractions c and d contact with each other thus causing heat transfer or heat distribution therebetween. This means that the solid bed is ruptured at many points and supplied with heat from hot molten resin through all boundary surfaces thus increasing the temperature of the solid bed and preventing overheating of the molten resin. Accordingly, the thermal distribution including the thermal hysteresis is made uniform and the blending action is enhanced. FIGS. 6E through 6J show the states in which the solid bed fraction c overlaps the solid bed fraction d while the molten resin is interposed at the interfaces c' and d' between the ruptured solid bed fractions c and d.

In the space 11a shown in FIG. 6A, on the other hand, the solid bed has already been ruptured into solid beds fractions a and b at point $P_1$ in the preceeding step and the solid bed fraction b overlaps the solid bed fraction a by the action described hereinabove. As the interface 14 at the front end of the solid bed fraction b which is freed in space 11a advances while scraping the molten resin, the molten resin is efficiently interposed in the interfaces between the solid bed fractions a and b and to cause the molten resin to come into shearing contact with the interface. In this manner, the solid bed fractions a and b are superposed in the space 11a. Thus in the steps subsequent to the step shown in FIG. 6E, solid bed fraction c severed from solid bed fraction b superposes upon solid bed fraction a. In FIG. 6G, the barrier 4 moves to the left as described above to raise the bottom surface 9a of the screw groove. Accordingly, the solid bed fraction c is raised further by the barrier 4 whereby the solid bed fractions c and a are worked over the entire volume of the space 11a. FIG. 6J shows a manner of working all portions of the solid bed fraction a while in the state shown in FIG. 6K, the bottom surface 9a of the screw groove descends again and the radial displacement of the barrier 4 terminates so that solid bed fractions a and c are broken at breaking point $P_5$ to form subsolid bed fractions e and f and g and h.

As described above, according to this invention, efficient blending is effected by the breaking action which occurs at a cross-point formed by the difference in the radial displacements of the upper end surface of the barrier 4 and the bottom surface 9 or 9a of the screw groove, by the pressure applied to all portions of the solid bed by both sides of the barrier 4 obliquely traversing the groove, and by complicated movements of the solid bed and the molten resin which are created by the fact that the barrier 4 extends in the form of a letter L with respect to the screw flight. Each of these actions that causes efficient blending is repeated continuously. Moreover, in the compression region, since the inclination angle of the barrier 4 with respect to the screw flight, the size of the gap defined by the barrier 4 and the inner wall 10 of the barrel, the width of the barrier, and the size of the gap defined by the bottom surface 9 or 9a of the screw groove and the inner wall 10 of the barrel vary gradually toward the discharge end, uniform blending can be effected more efficiently.

FIGS. 7A through 7L show the behaviors of the solid bed of a modified screw having a meterring region similar to that shown in FIGS. 4 and 5. Each of FIGS. 7A through 7L shows a shape of a screw groove cut at right angles with respect to the screw flight. The gap in this embodiment between the barrier 4 and the inner wall 10 in the meterring region is made to be much smaller than those in the supply region and compression region and the barrier 4 traverses obliquely the screw groove at a larger angle $\theta$ with respect to the flight so as to selectively melt the not yet molten resin and more efficiently blend the molten resin. In FIGS. 7A through 7J, the gap defined by the bottom surfaces 9 and 9a of the screw groove and the barrel inner wall 10 and the barrier gap defined by the barrier 4 and the barrel inner wall are shown exaggerated for the sake of description. In FIGS. 7A through 7L, the not yet molten resins a and b remaining in the spaces 11a and 11 are selectively melted by the gap between the hill 2 at the bottom of the groove and the barrel inner wall, and the barrier gap which are larger than the gap defined by the screw flight 1 and the barrel inner wall 10. The molten resin is subjected to a large blending force at the barrier gap. As the molten resin passes through the barrier gap, especially where the direction of movement of the screw relative to the barrel inner wall 10 is opposite to the direction of movement of the molten resin, the molten resin merges into the flow of the molten resin caused by the attraction of the barrel at a point beyond the barrier 4. On the other hand, when these directions are the same, the flow of the molten resin is divided by the edge line of the barrier 4 and roughly blended. Although, as a whole, the molten resin moves toward the discharge side, local counterflow occurs. This is caused by the fact that the barrier is not parallel with the screw flight but extends at an angle with respect thereto and displaced in the axial direction, that the bottom surface of the screw groove is displaced in the radial direction and that the barrier gap is extremely narrow. With this construction, the molten resin is blended wholly or locally while repeating discretion, merging and counterflow, whereas the solid resin is selectively melted and uniformly heated, thereby providing homogeneous mixture. Of course, the sum of volumes the screw groove spaces is selected to provide the desired discharge capacity of the screw.

As described above, with the improved screw of this invention, it is possible to uniformly melt the resin, and to progressively melt the resin so as to homogenize the thermal hysteresis, accelerate the melting and improve gas removal thus producing a large quantity of high quality molten resin. For the same degree of uniform plasticization as a conventional screw, the length of the screw can be decreased with smaller thermal hysteresis. Thus obtaining moulded products of higher qualities at higher yields.

Of course, it is possible to suitably vary the width of the barrier, the size of the barrier gap, the angle between the barrier and the screw flight and the size of the gap between the screw groove and the barrel for the inlet side and the discharge side depending upon the type of the resin to be moulded. Such parameters may be constant within a certain region of the screw. The direction of the barrier may be selected at will depending upon the type of the resin and its use so long as the barrier is included in an area containing the radial positions at which the top of the hill in the screw groove and the wave at the bottom of the screw groove cross with each other.

Depending upon the type of resin and its use, it is also possible to divide the bottom surface of the screw groove into three or more portions, or to vary the period per pitch of alternately displacing the divided bottom surfaces in the radial direction. For a crystalline resin, polypropylene, nylon, etc. for example, it is advantageous to increase the pitch of the wave per one pitch of the screw. It is also advantageous to interconnect the hill and valley at the bottom of the screw groove, and the barrier and the valley which are at different levels so as to ensure smooth flow of the resin. The cross-sectional profile of the groove bottom taken along the screw flight is not limited to circle as shown but may be eliptical, or cam shaped. When desired, a notch may be provided at a portion of the valley or the top of the hill and at a portion of the meterring region where the melting of the resin completes, for passing the molten resin thus creating a turbulent flow which enhances the blending action.

What is claimed is:

1. A screw provided with one helical flight and one valley along the flight and utilized in cooperation with a cylindrical barrel at high temperatures for molding a resinous material, the screw being rotated to advance the helical flight while working the resinous material initially in the form of a solid bed into a melt, the bottom surface of the valley being divided into a plurality of portions along a dividing line extending along said screw flight, said divided portions of the bottom surface being alternately displaced in the radial direction along said screw flight to form wavy contours, the improvement wherein a plurality of barriers each crossing said dividing line are provided to form a dam between one hill and the opposite hill at the bottom of the screw for preventing intercommunication of the valleys of said divided portions, each barrier having one edge line extending from the one hill and terminating in the hillside of the opposite hill to form one cross point, and the other edge line extending from said opposite hill and terminating in the hillside of said one hill to form the other cross point, said barriers being inclined at an angle with respect to said screw flight such that one of the angularly adjacent dams and the other lie in mutually intersecting directions.

2. A screw according to claim 1 wherein said cylindrical barrel has a supply region, a metering region and a compression region, and wherein the gap between the barrier and the barrel inner wall of the metering region is smaller than the corresponding gaps in the supply and compression regions.

* * * * *